Feb. 24, 1931.   F. REPECK   1,794,203
DIFFERENTIAL CARRIER
Filed May 27, 1929
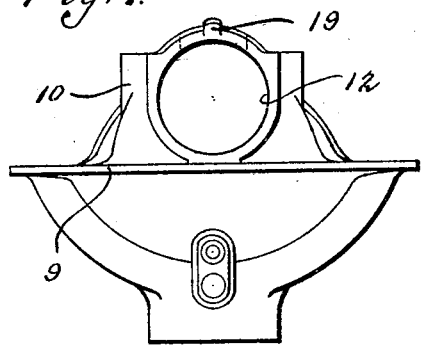
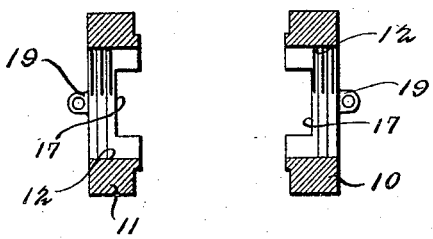
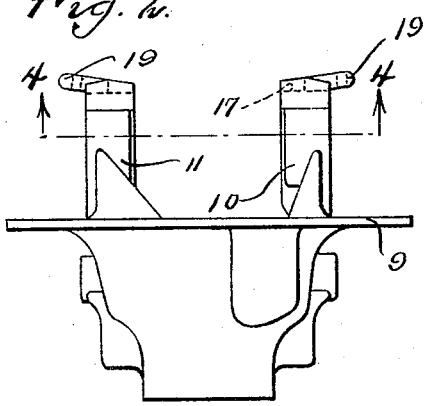
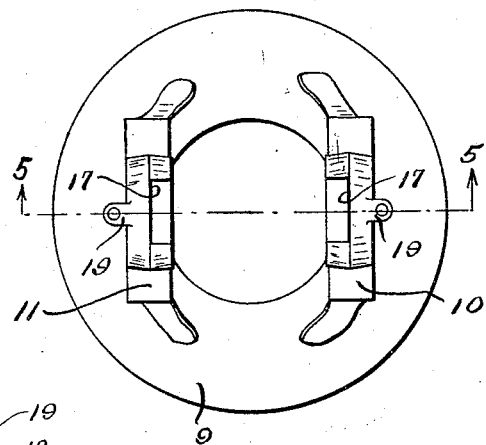
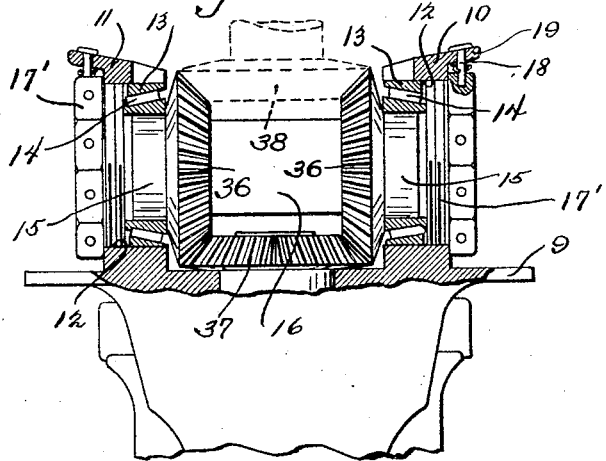
INVENTOR.
Frank Repeck.
BY
ATTORNEY.

Patented Feb. 24, 1931

1,794,203

UNITED STATES PATENT OFFICE

FRANK REPECK, OF DETROIT, MICHIGAN

DIFFERENTIAL CARRIER

Application filed May 27, 1929. Serial No. 366,189.

My invention relates to a new and useful improvement in a differential carrier and has for its object the provision of a carrier whereby the bearing caps may be eliminated and which will permit the positioning of the differential in the carrier without requiring the removal of any parts on the upper portion of the carrier.

Another object of the invention is the provision of a differential carrier in which the parts will be reduced to a minimum.

Another object of the invention is the provision of a differential carrier which will permit of ready and quick assembly of the differential in the carrier.

Another object of the invention is the provision of a differential carrier which may be economically manufactured and which will be durable and efficient in use.

Other objects will appear hereinafter.

The invention consists in the combination and arrangement of parts hereinafter described and claimed.

The invention will be best understood by a reference to the accompanying drawings which form a part of this specification and in which, Fig. 1 is an end elevational view of the invention.

Fig. 2 is a side elevational view of the invention.

Fig. 3 is a top plan view of the invention.

Fig. 4 is a sectional view taken on line 4—4 of Fig. 2.

Fig. 5 is a fragmentary sectional view taken on line 5—5 of Fig. 3.

The carrier as fabricated to embody the invention is in its major parts constructed in the conventional and well known manner. A flange 9 is provided to which may be attached the ring gear (not shown) which is driven by the driving pinion (not shown).

Projecting upwardly from the flange 9 are the spaced standards 10 and 11, each of which is provided with the circular opening 12 formed therein and in each of which engages the supporting ring 13 which serves as a retainer for the bearing 14 in which engages the trunnions or necks 15 of the axle gears 36 of the differential 16, the differential pinions 38 and 37 being also illustrated. The inner side of the upper portion of each of the supports 10 and 11 is cut away as at 17, the space between the opposite face of the cut away portions 17 being sufficient to permit the passage of the differential into position between the supports or standards 10 and 11.

In assembly, the differential is placed in position by passing the trunnions downwardly through the cut away portions 17. The bearings are then placed on the trunnions and the retaining rings 13 placed in position on the bearings. The locking rings 17' are then threaded into the ends of the standard 10 and 11 and a pin 18 is projected through the lug 19 so as to lock the rings 17' in position.

The structure as described is as now ordinarily manufactured excepting that the standards are split to provide a cap which is removed when the differential is placed in position. The invention, therefore, eliminates this cap and provides a means of assembly whereby considerable saving in labor is effected in the manufacture of the invention and whereby considerable time is saved in the assembly and disassembly.

While I have illustrated and described the preferred form of my invention, I do not wish to limit myself to the precise details of structure shown but desire to avail myself of such variations and modifications as come within the scope of the appended claims.

Having thus described my invention, what I claim as new and desire to secure by Letters Patent is:

1. A differential carrier of the class described comprising: a pair of journal bearing standards, each of said standards having a recess cut away at its upper edge for permitting the passage of the differential spider into position.

2. A differential carrier of the class described comprising: a pair of journal supporting standards, each adapted for reception of a stud shaft, and each being provided adjacent its upper end with a cut away portion for permitting the projection of said stud shafts between said standards.

3. In a differential carrier: journal forming members in spaced relation and each having a portion cut away to permit the passage of the shaft to be journalled therein into position between said standards through engagement in said cut away portion.

4. In a differential carrier: journal forming members in spaced relation, each having a portion cut away to permit the passage of the shaft to be journaled therein, into position between said journals through engagement in said cut-away portion; a shaft journaled in each of said journal forming members; a bearing on each of said shafts; and a retaining ring engaging the inner surface of said journals and serving to close said cut away portion.

5. A differential carrier, comprising: a bed; a pair of standards projecting upwardly from said bed in spaced relation, each of said standards having a circular opening formed therein for providing a shaft journal, the upper end of said standards on the inner face thereof being cut-away into its opening; and a retaining ring engaging the inner surface of each of said openings and serving to close the cut-away portion.

In testimony whereof I have signed the foregoing specification.

FRANK REPECK.